(12) United States Patent
Kao et al.

(10) Patent No.: US 7,048,426 B2
(45) Date of Patent: May 23, 2006

(54) BACKLIGHT MODULE

(75) Inventors: Ko-Chia Kao, Pingtung (TW);
Yi-Chun Lin, Hsinchu (TW);
Chih-Kuang Chen, Kaohsiung (TW)

(73) Assignee: AU Optronics Corp., Hsinchu (TW)

( * ) Notice: Subject to any disclaimer, the term of this patent is extended or adjusted under 35 U.S.C. 154(b) by 145 days.

(21) Appl. No.: 10/841,112

(22) Filed: May 7, 2004

(65) Prior Publication Data
US 2005/0213346 A1    Sep. 29, 2005

(30) Foreign Application Priority Data
Mar. 24, 2004  (TW) .............................. 93107902 A

(51) Int. Cl.
*F21V 7/04* (2006.01)
(52) U.S. Cl. ..................... 362/616; 362/613; 362/607
(58) Field of Classification Search ........ 362/608–609, 362/612, 613, 615–617; 349/62, 65
See application file for complete search history.

(56) References Cited

U.S. PATENT DOCUMENTS 5,161,873 A * 11/1992 Obata ......................... 362/613
6,104,454 A * 8/2000 Hiyama et al. ............... 349/65

OTHER PUBLICATIONS

"High-efficiency Slim LED Backlight System with Mixing Light Guide" Martynov et al.; SID 03 Digest.

* cited by examiner

*Primary Examiner*—Ali Alavi
(74) *Attorney, Agent, or Firm*—Thomas, Kayden, Horstemeyer & Risley

(57) ABSTRACT

A backlight module. The backlight module includes a first light guide, a second light guide, and a plurality of light sources. The second light guide comprises a least one first medium transmissive and a least one second transmissive medium. The transmissive media are disposed between the incident surface and the emergent surface and have different refractive indices. Light emitted from the light sources enters the second light guide through an incident surface of the second light guide and exits the second light guide through an emergent surface thereof. Light emitted from the second light guide enters the first light guide through a first side surface thereof.

15 Claims, 3 Drawing Sheets

BACKLIGHT MODULE

BACKGROUND OF THE INVENTION

1. Field of the Invention

The present invention relates to a backlight module, and in particular to a backlight for a liquid crystal display merging light emitted from light sources of different colors.

2. Description of the Related Art

Liquid crystal displays (LCDs) are applied in many electronic devices, such as cellular telephones, digital cameras, and personal digital assistant, and other devices used in environments of width varying degrees of light and shade degrees environmental brightness. In order to provide adequate display, backlight sources are located in the rear of the panels. In conventional liquid crystal displays, cold cathode fluorescent tubes (CCFLs) emitting white light serve as the backlight sources. However, because it is difficult to manufacture CCFLs with small diameters, the CCFLs are limited in application to small electronic devices. In addition, the CCFLs have higher voltage requirements and larger power consumption, are susceptible to electromagnetic interference, and present environmental concern due to use of mercury wherein.

Accordingly, light emitting diodes (LEDs) have been applied as backlight sources for LCD. White LEDs can serve as a backlight source, but have high manufacturing cost, or red, green, and blue LEDs can serve as source by merging three colors into white light, requiring additional optical merging components.

A backlight system is described by Yourii Martynov et al, "high-efficiency slim LED backlight system with mixing light guide", 2003 SID Digest pp. 1259–1261 as shown in FIG. 1 in a schematic cross-section. The LED backlight system comprises a plurality of LEDs, a 90° elliptical mirror 10, a mixing light guide 11, a 180° elliptical mirror 12, and a main light guide 13. The LEDs are disposed in a row and comprise red, green, and blue LEDs, although only LED $D1_1$ is present in FIG. 1. Red, green, and blue light from the LEDs is reflected by the 90° elliptical mirror 10 to the mixing light guide 11, wherein the direction of light is changed by reflective layers of the mixing light guide 11. White light is produced by continuous changing of the direction of the red, green, and blue light. The mixed white light exits the mixing light guide 11 and is then reflected by the 180° elliptical mirror 12 to the main light guide 13. The main light guide 13 converts the mixed white light to planar light and emits the planar light to back-end optical components, for application to the LCD panel.

However, since the direction of the light is changed only when contacting the reflective layers, adequate merging length is required in the mixing light guide 11. In the above LED backlight system, however the merging distance is around 75 mm, a distance which cam limit application in small device.

SUMMARY OF THE INVENTION

Accordingly, an object of the present invention is to provide a backlight module for uniformly merging red, green, and blue light, utilizing a reduced merging distance.

According to the object, the present invention provides a backlight module comprising a first light guide, a second light guide, and a plurality of light sources. The second light guide has an incident surface and an emergent surface and comprises at least one first transmissive medium and a least one second transmissive medium. The transmissive media are disposed between the incident surface and the emergent surface and can have different refractive indices. The light sources are disposed corresponding to the incident surface. Light from the light sources enters the second light guide through the incident surface and exits the second light guide through the emergent surface, entering the first light guide through the first side surface.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
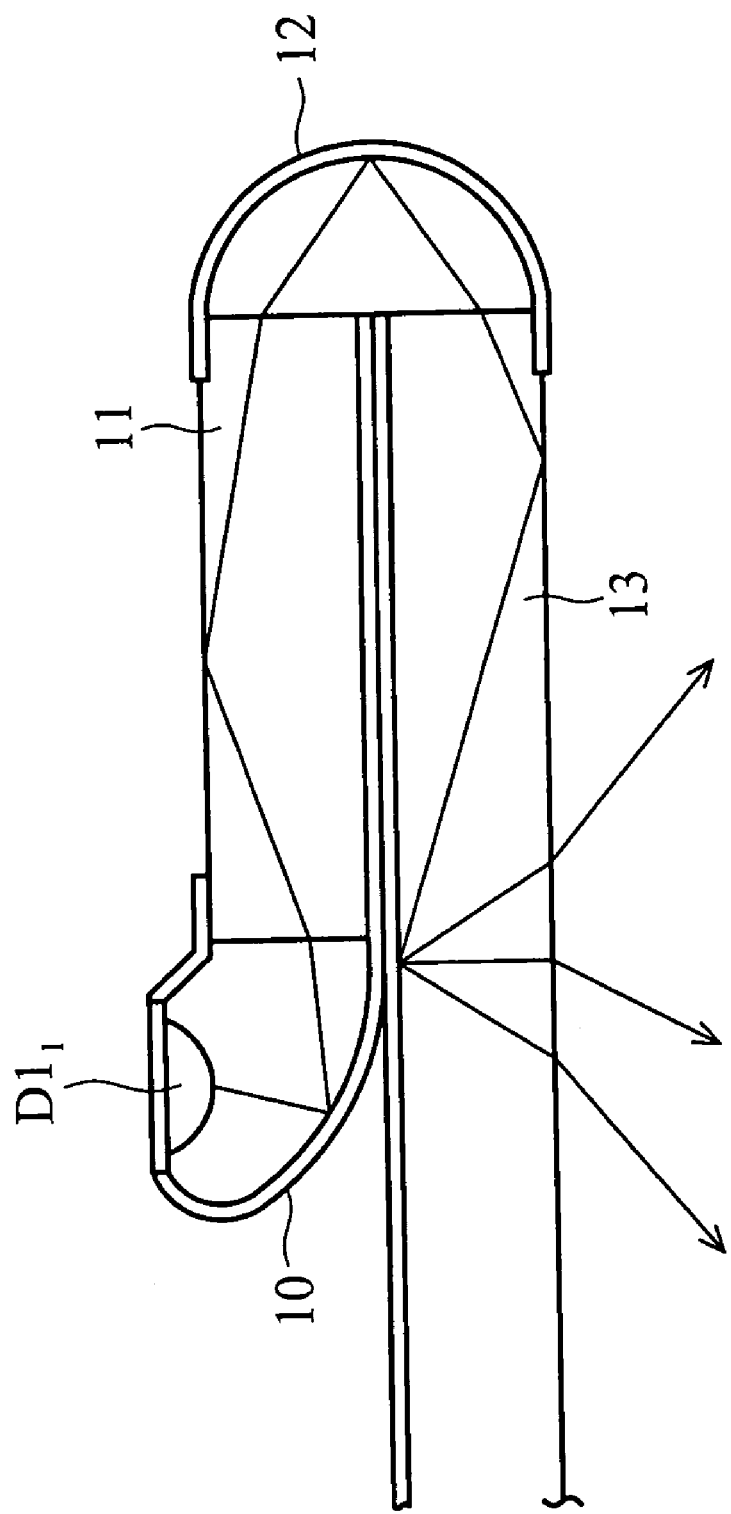
FIG. 1 is a schematic cross-section of a conventional LCD backlight system.
Figure 2:
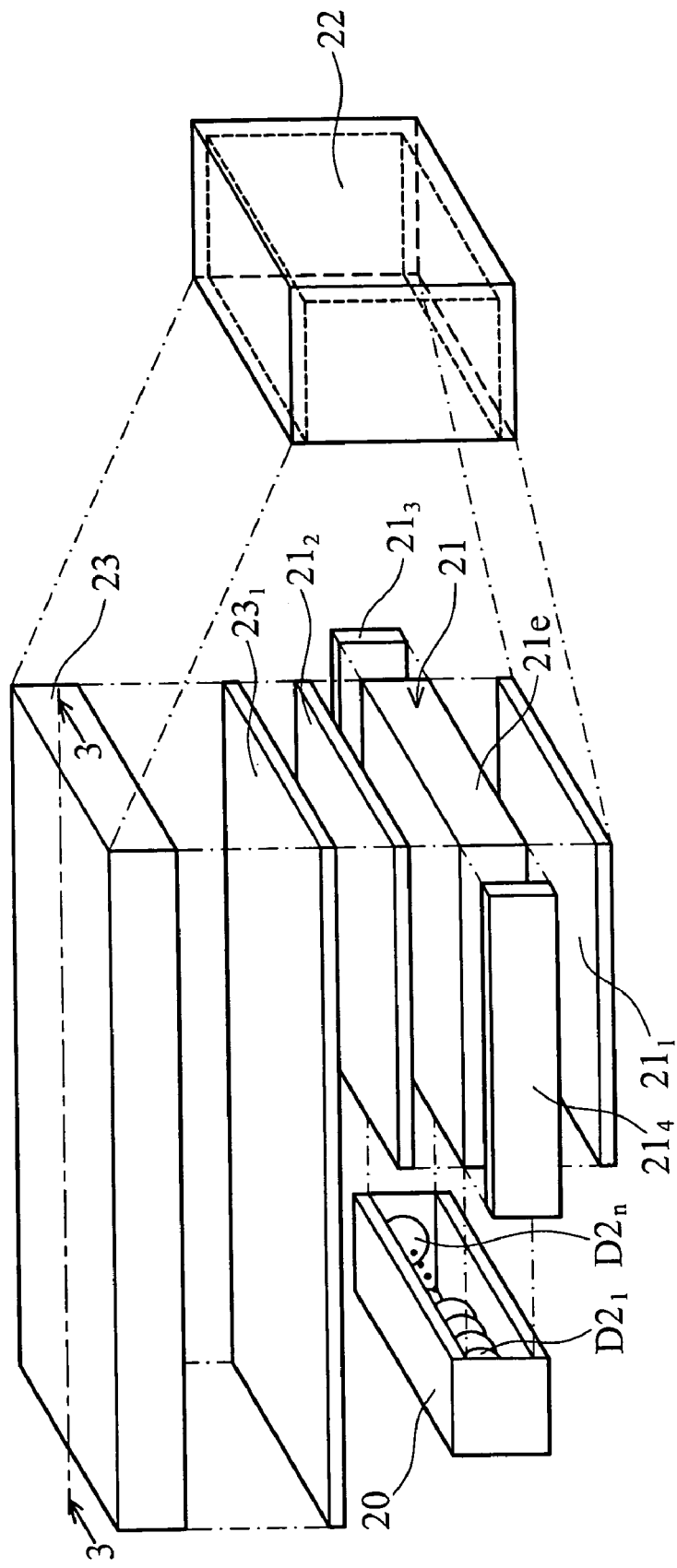
FIG. 2 is an exploded diagram of the backlight module of the present invention.
Figure 3:
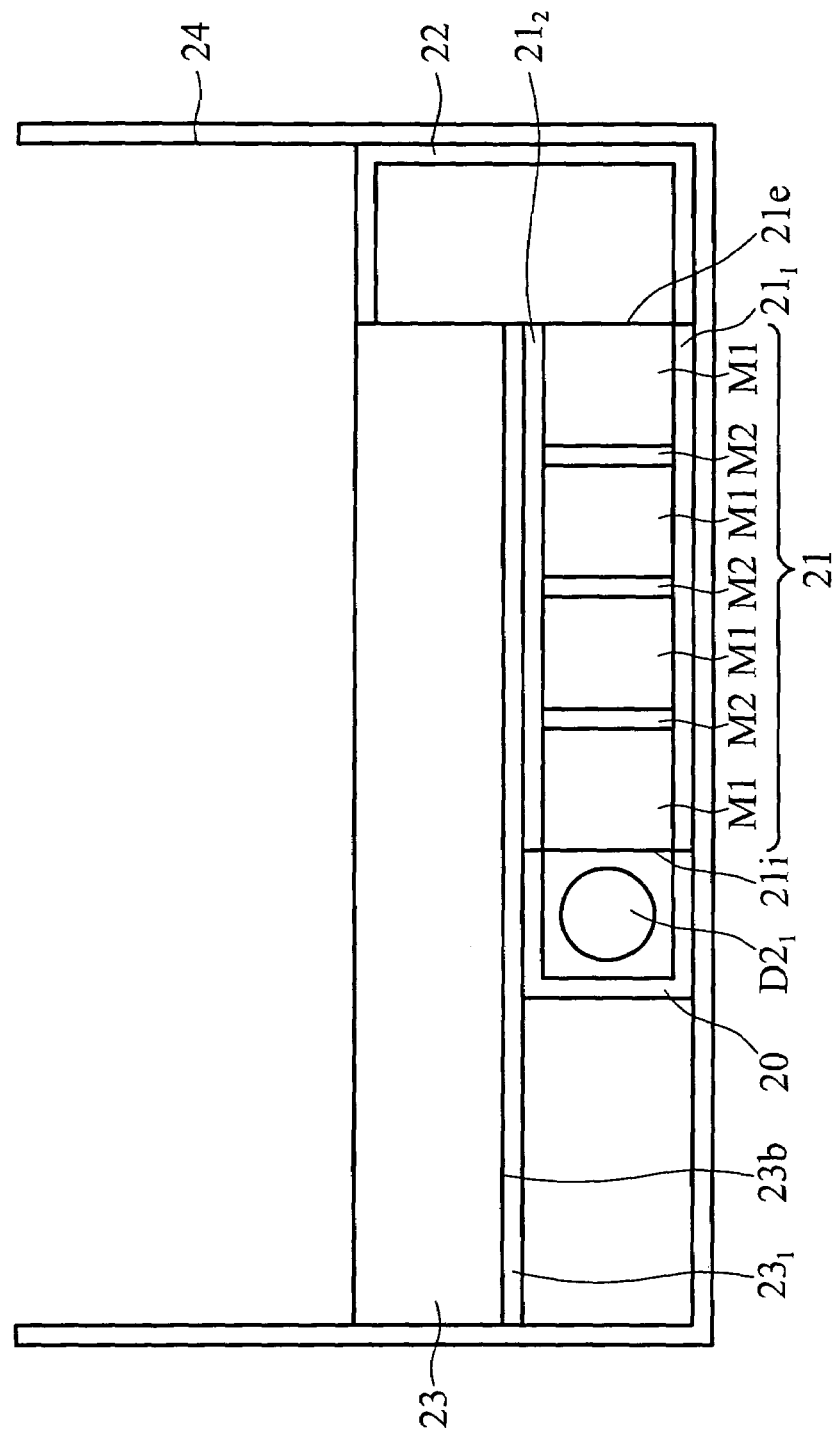
FIG. 3 is a cross-section along line 3—3 in FIG. 2.

FIG. 2 is an exploded diagram of the backlight module of the present invention. FIG. 3 is a cross-section along line 3—3 in FIG. 2 and only shows the LED $D2_1$. Referring to FIGS. 2 and 3, the backlight module 2 comprises a plurality of light sources, an elongated shade 20, a merging light guide 21, a reflective plate 22, a main light guide 23, and a housing 24 (shown in FIG. 3). In the embodiment, LEDs $D2_1$ to $D2_n$, serving as light sources, are disposed in a row within the elongate shade 20 and comprise red, green and blue light emitting diodes. The merging light guide 21 is disposed under the main light guide 23. Excepting an incident and emergent surface of the merging light guide 21, reflective layers $21_1$ to $21_4$ respectively cover all four side surfaces thereof. A reflective layer $23_1$ covers a back surface $23_b$ of the main light guide 23. Red, green, and blue light beams from LEDs $D2_1$ to $D2_n$ enter the merging light guide 21 through the incident surface $21i$ thereof and merged into white light. The merged white light exits the merging light guide 21 through the emergent surface $21e$ to the reflective plate 22 and is then reflected by the reflective plate 22 to the main light guide 23. The main light guide 23 converts the merged white light to planar light. It is noted that the merging light guide 21 differs from the mixing light guide 11 formed with a single transmissive medium in the conventional LED backlight system, comprising at least two transmissive media, M1 and M2.

As shown in FIG. 3, the housing 24 houses the LEDs $D2_1$ to $D2_n$, the elongated shade 20, the merging light guide 21, the reflective plate 22, and the main light guide 23. The merging light guide 21 comprises transmissive media M1 and M2, alternately arranged. In the embodiment of the present invention, transmissive medium M1 is polymethyl methacrylate (PMMA) with 1.49 refractive index and transmissive medium M2 a vacuum with 1 refractive index.

As shown in FIG. 3, elongated shade 20 partially covers LEDs $D2_1$ to $D2_n$ and has a reflective inner surface (not shown). Red, green, and blue light emitted from LEDs $D2_1$ to $D2_n$ enters to the merging light guide 21 through the incident surface $21i$ thereof, passing through transmissive media M1 and M2 alternately. Because of the different refractive indices of the transmissive media, the red, green, and blue light is refracted. Thus, even if overall the length of the merging light guide 21 is reduced, refraction of the red, green, and blue light via the transmissive media M1 and M2 allows adequate merging to produce white light. The merged white light exits the merging light guide 21 through the emergent surface 21e and is reflected by the reflective plate 22 to the main light guide 23. The main light guide 23 converts the merged white light to planar light.

In order to completely utilize the red, green, and blue light emitted from the LEDs $D2_1$ to $D2n$, the elongated shade 20 has a reflective inner surface (not shown), by means of which part of the light emitted the LEDs $D2_1$ to $D2n$ is reflected to the merging light guide 21. As well, in order to avoid light leakage, four side surfaces of the merging light guide 21 are respectively covered by the reflective layers $21_1$ to $21_4$. Light contacting the reflective layers $21_1$ to $21_4$ is reflected to transmissive media M1 or M2. An inner surface of the housing 24 also comprises a reflective layer. In the present invention, the reflective layers $23_1$ and $21_2$ are integrally formed.

In an embodiment of the present invention, PMMA and vacuum are applied in transmissive media M1 and M2. In practical application, the transmissive media M1 and M2 can comprise a wide variety of transmissive media having different refractive indices. The light sources can also comprise other light emitting elements, without limitation.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A backlight module comprising:
   a first light guide comprising a first side surface;
   a second light guide comprising an incident surface and an emergent surface and comprising a plurality of first transmissive media and a plurality of second transmissive media, wherein the first transmissive media and the second transmissive media are alternately disposed between the incident surface and the emergent surface, each of the first transmissive media has a first refractive index, and each of the second transmissive media has a second refractive index different from the first refractive index; and
   a plurality of light sources corresponding to the incident surface, with light emitted therefrom entering the second light guide through the incident surface and exits the second light guide through the emergent surface, and then entering the first light guide through the first side surface.

2. The backlight module as claimed in claim 1, further comprising a reflective plate corresponding to the first side surface and the emergent surface and reflecting the light from the second light guide to the first light guide.

3. The backlight module as claimed in claim 2, wherein light emitted from the light sources enters the second light guide through the incident surface and exits the second light guide through the emergent surface to the reflective plate.

4. The backlight module as claimed in claim 2, wherein light from the second light guide is reflected by the reflective plate to the first light guide through the first side surface.

5. The backlight module as claimed in claim 1, wherein the first light guide is disposed on the side of the second light guide.

6. The backlight module as claimed in claim 1, wherein the light source emits light of different colors.

7. The backlight module as claimed in claim 1, wherein the light sources are differently colored light emitting diodes.

8. The backlight module as claimed in claim 1, wherein the second light guide and the light sources are disposed under the first light guide and the first side surface corresponds to the emergent surface.

9. The backlight module as claimed in claim 1, wherein the first light guide has a back surface covered by a reflective layer.

10. The backlight module as claimed in claim 1, wherein, excepting the incident surface and the emergent surface, all side surfaces of the second light guide respectively comprise reflective layers.

11. The backlight module as claimed in claim 1, further comprising an elongated shade partly covering the light sources.

12. The backlight module as claimed in claim 11, wherein the elongated shade comprises reflective inner surfaces.

13. The backlight module as claimed in claim 1, further comprising a housing for the first light guide, the second light guide, and the light sources.

14. The backlight module as claimed in claim 13, wherein an inner surface of the housing comprises a reflective layer.

15. The backlight module as claimed in claim 1, wherein the first transmissive media are polymethyl methacrylate and the second tranmissive media are vacuums.

\* \* \* \* \*